(12) United States Patent
Han

(10) Patent No.: US 11,315,443 B2
(45) Date of Patent: Apr. 26, 2022

(54) DISPLAY DEVICE

(71) Applicant: Wuhan China Star Optoelectronics Semiconductor Display Technology Co., Ltd., Wuhan (CN)

(72) Inventor: Wen Han, Wuhan (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 195 days.

(21) Appl. No.: 16/639,594

(22) PCT Filed: Nov. 6, 2019

(86) PCT No.: PCT/CN2019/115914
§ 371 (c)(1),
(2) Date: Feb. 17, 2020

(87) PCT Pub. No.: WO2021/017252
PCT Pub. Date: Feb. 4, 2021

(65) Prior Publication Data
US 2021/0383727 A1 Dec. 9, 2021

(30) Foreign Application Priority Data
Jul. 29, 2019 (CN) .......................... 201910686583.0

(51) Int. Cl.
*G06F 1/16* (2006.01)
*G09F 9/30* (2006.01)

(52) U.S. Cl.
CPC ............ *G09F 9/301* (2013.01); *G06F 1/1624* (2013.01); *G06F 1/1652* (2013.01); *G06F 1/1656* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,639,237 B2* | 12/2009 | Perkins | ................. | G06F 1/1677 345/168 |
| 7,830,333 B2* | 11/2010 | Aoki | ..................... | G06F 1/1616 345/1.3 |
| 7,965,258 B2* | 6/2011 | Aoki | ..................... | G06F 1/1641 345/1.3 |
| 8,174,628 B2* | 5/2012 | Matsushita | ........... | G06F 3/1423 348/836 |
| 8,379,377 B2* | 2/2013 | Walters | ................. | G06F 1/1652 361/679.04 |
| 8,380,327 B2* | 2/2013 | Park | ...................... | G05B 11/01 700/1 |

(Continued)

FOREIGN PATENT DOCUMENTS

| | | |
|---|---|---|
| CN | 101689004 | 3/2010 |
| CN | 102902308 | 1/2013 |

(Continued)

*Primary Examiner* — Lisa Lea-Edmonds

(57) ABSTRACT

The present disclosure provides a display device that includes a housing and a flexible display panel. The display area has an exposed part and an unexposed part, the exposed part is partially or fully exposed within the housing, and the unexposed part is received in the housing, to realize for switching between a large-screen display state and a small-screen display state. Thus, it has effects for small size and long lifetime.

14 Claims, 7 Drawing Sheets

(56) References Cited

U.S. PATENT DOCUMENTS

| | | | | |
|---|---|---|---|---|
| 8,493,714 | B2* | 7/2013 | Visser | G09F 9/301 |
| | | | | 361/679.01 |
| 8,493,726 | B2* | 7/2013 | Visser | G09F 9/301 |
| | | | | 361/679.3 |
| 8,711,566 | B2* | 4/2014 | O'Brien | G06F 1/1624 |
| | | | | 361/724 |
| 8,787,008 | B2* | 7/2014 | Walters | G06F 1/1652 |
| | | | | 361/679.21 |
| 9,195,272 | B2* | 11/2015 | O'Brien | G06F 1/1624 |
| 9,519,313 | B2* | 12/2016 | Kim | G06F 1/166 |
| 9,829,925 | B2* | 11/2017 | Lim | G06F 1/1652 |
| 9,911,369 | B2* | 3/2018 | Kim | G09F 9/301 |
| 10,082,833 | B2* | 9/2018 | Chen | G06F 1/1652 |
| 10,152,086 | B2* | 12/2018 | Choi | G06F 1/1652 |
| 10,430,923 | B2* | 10/2019 | Lu | H05K 5/0017 |
| 10,488,959 | B2* | 11/2019 | Aurongzeb | G06F 1/1679 |
| 10,691,172 | B2* | 6/2020 | Jovanovic | G09F 9/00 |
| 10,817,022 | B2* | 10/2020 | Cho | G06F 3/0487 |
| 10,868,264 | B2* | 12/2020 | Shin | H01L 27/323 |
| 10,881,009 | B2* | 12/2020 | Jiang | H05K 5/0017 |
| 10,972,592 | B2* | 4/2021 | Song | H04M 1/0237 |
| 11,003,207 | B2* | 5/2021 | Kim | G06F 1/1681 |
| 11,016,532 | B2* | 5/2021 | Yang | G06F 1/1616 |
| 11,100,818 | B1* | 8/2021 | Feng | G09F 9/301 |
| 11,112,826 | B2* | 9/2021 | Ko | G06F 1/1681 |
| 2010/0182738 | A1 | 7/2010 | Visser et al. | |
| 2012/0212433 | A1* | 8/2012 | Lee | G06F 1/1652 |
| | | | | 345/173 |
| 2014/0211399 | A1 | 7/2014 | O'Brien | |
| 2017/0140504 | A1* | 5/2017 | Jeong | G06T 3/40 |
| 2017/0212556 | A1* | 7/2017 | Jovanovic | G06F 1/1652 |
| 2018/0077808 | A1* | 3/2018 | Seo | G06F 1/1652 |
| 2018/0081473 | A1* | 3/2018 | Seo | G06F 3/0412 |
| 2018/0181164 | A1 | 6/2018 | Chen | |
| 2019/0146558 | A1* | 5/2019 | Ohata | G09G 5/005 |
| | | | | 361/679.21 |
| 2019/0261519 | A1* | 8/2019 | Park | G02F 1/133305 |
| 2019/0346954 | A1* | 11/2019 | Jung | G06F 1/3209 |
| 2019/0384438 | A1* | 12/2019 | Park | G06F 3/0412 |
| 2020/0152095 | A1* | 5/2020 | Lee | G06F 3/147 |
| 2020/0159291 | A1 | 5/2020 | Dong | |
| 2020/0264660 | A1* | 8/2020 | Song | H04M 1/0268 |
| 2020/0267246 | A1* | 8/2020 | Song | G06F 1/1624 |
| 2020/0394940 | A1* | 12/2020 | Thompson | G09F 13/044 |
| 2021/0076517 | A1* | 3/2021 | Wang | H04M 1/0268 |
| 2021/0149515 | A1* | 5/2021 | Park | G06F 1/1652 |
| 2021/0191558 | A1* | 6/2021 | Jung | G09G 5/003 |
| 2021/0195008 | A1* | 6/2021 | Lee | H04M 1/0268 |
| 2021/0274662 | A1* | 9/2021 | Myers | H05K 1/181 |
| 2021/0328160 | A1* | 10/2021 | Feng | H01L 51/5237 |

FOREIGN PATENT DOCUMENTS

| | | |
|---|---|---|
| CN | 103763409 | 4/2014 |
| CN | 106663392 | 5/2017 |
| CN | 106847103 | 6/2017 |
| CN | 107424518 | 12/2017 |
| CN | 107818735 | 3/2018 |
| CN | 107845333 | 3/2018 |
| CN | 107919063 | 4/2018 |
| CN | 108040154 | 5/2018 |
| CN | 207781089 | 8/2018 |
| CN | 108520702 | 9/2018 |
| CN | 108563286 | 9/2018 |
| CN | 208044998 | 11/2018 |
| CN | 208737802 | 4/2019 |
| CN | 110033707 | 7/2019 |
| CN | 110047384 | 7/2019 |

* cited by examiner

DISPLAY DEVICE

RELATED APPLICATIONS

This application is a National Phase of PCT Patent Application No. PCT/CN2019/115914 having International filing date of Nov. 6, 2019, which claims the benefit of priority of Chinese Patent Application No. 201910686583.0 filed on Jul. 29, 2019. The contents of the above applications are all incorporated by reference as if fully set forth herein in their entirety.

FIELD AND BACKGROUND OF THE INVENTION

The present disclosure relates to the technical field of display manufacturing, and specifically to a display device with an expandable screen.

Applications provided by flexible display devices are more and more favored. Flexible screen type mobile phones refer to bendable mobile phones with flexible screens. Compared with traditional screens, the flexible screens have obvious advantages, not only in terms of volume, but also in terms of power consumption that is lower than original devices. It would help to improve endurance of devices. Meanwhile, based on their characteristics of bendable and flexible, durability of the flexible screen is much higher than that of the traditional screen, thereby reducing a probability of accidental damage to devices.

In order to realize a folding function of the flexible screens, in addition to the screens themselves, how to realize a folded connection assembly, i.e., a design of a connection shaft at a bent position, is also the biggest technical problem. For bendable screen display devices in the prior art, after a screen is folded, the display devices have a large volume, which is difficult to meet market demand of thin and light displays. In addition, the screen is affected by bending stress, risk of disconnection in the screen is easy to appear, and lifetime is limited.

In summary, bendable display devices in the prior art have technical defects of large volume and short lifetime, and needs to be improved.

SUMMARY OF THE INVENTION

The present disclosure provides a display device, in which a flexible display panel is partially received in a housing of the display device, and a display area of the display panel can be extended based on demand, in order to solve technical defects of large volume and short lifetime to bendable display devices in the prior art.

In order to solve the above problem, technical schemes, according to the present disclosure are provided as follows.

The present disclosure provides a display device, which includes: a housing having a display window; and a flexible display panel having a display area, wherein the display area has an exposed part and an unexposed part, the exposed part is partially or fully exposed within the display window, and the unexposed part is deformably disposed in the housing.

According to an embodiment of the present disclosure, a surface of the flexible display panel is provided with a transparent cover plate, two ends of the transparent cover plate beyond an edge of the flexible display panel form a curled end and a traction end opposite to each other, the curled end is unfoldably disposed in the housing, the traction end is movably disposed outside the housing, and when the traction end is moved toward an outer side of the housing, the curled end is unfolded and the transparent cover plate and the flexible display panel both located in the housing are moved to the outer side of the housing.

According to an embodiment of the present disclosure, a supporting board is further disposed in the housing and is located on an inner side of the display window, wherein the exposed part of the flexible display panel and the traction end of the transparent cover plate are attached to the supporting board, and wherein the unexposed part of the display region is bent onto another side of the supporting board.

According to an embodiment of the present disclosure, a scroll and an active shaft parallel to each other are further disposed in the housing, the active shaft is located at a first end of the housing where the traction end is disposed, and the scroll is located at a second end opposite to the first end of the housing, wherein the curled end of the transparent cover plate is fixed onto the active shaft, a middle portion of the transparent cover plate goes round the scroll, and the traction end of the transparent cover plate is fixed onto an outer end of the supporting board, wherein the active shaft is provided with a gear, a bottom of the supporting board is provided with a rack that is engaged with the gear, the active shaft rotates in conjunction with a movement of the supporting board, and when the traction end is moved toward the outer side of the housing, the gear and the rack are in transmission coordination to make that the active shaft rotates to push the transparent cover plate and the flexible display panel both located in the housing to the display window.

According to an embodiment of the present disclosure, the supporting board includes a fixing plate and an extension plate, the fixing plate is disposed within the display window, the extension plate movably engages with the fixing plate for extendedly forming a virtual display window, wherein one end of the flexible display panel is connected to one end of the extension plate.

According to an embodiment of the present disclosure, the extension plate is fitted with the fixing plate, and the extension plate is aligned with a surface of the fixing plate in a fitted state and in an extended state.

According to an embodiment of the present disclosure, the extension plate includes a first frame and a first fence support part located in the first frame, wherein the first frame has an opening end; the fixing plate includes a second frame and a second fence support part located in the second frame, wherein the second frame has an opening end; and the opening end of the first frame is movably connected to the opening end of the second frame, and the first fence support part and the second fence support part are fitted to each other in an interlace manner.

According to an embodiment of the present disclosure, the extension plate is slidably engaged with the fixing plate, an inner side of the first fence support part is provided with clamping edge portions, an inner side of the second fence support part is provided with sliding slots, and the clamping edge portions are slidably engaged with the sliding slots.

According to an embodiment of the present disclosure, an outer side of the extension plate is provided with a lateral plate, and the lateral plate is attached to or away from the housing.

According to an embodiment of the present disclosure, a supporting board is further disposed in the housing and is made of a repeatable bending material, wherein the supporting board has a part located within the display window and remaining parts disposed in the housing, and wherein the transparent cover plate and the flexible display panel are attached to a surface of the supporting board.

According to an embodiment of the present disclosure, the supporting board includes an extension side and a fixed side opposite to the extension side, and the fixed side is curled.

According to an embodiment of the present disclosure, a scroll and an active shaft parallel to each other are disposed in the housing, the active shaft is located at a first end of the housing where the traction end is disposed, and the scroll is located at a second end opposite to the first end of the housing, wherein the curled end of the transparent cover plate is fixed onto the active shaft, a middle portion of the transparent cover plate goes round the scroll, and the extension side of the supporting board is slidably engaged with an inner side of the housing, wherein the active shaft is provided with a gear, a bottom of the supporting board is provided with a rack that is engaged with the gear, the active shaft rotates in conjunction with a movement of the supporting board, and when the supporting board is moved toward the outer side of the housing, the gear and the rack are in transmission coordination to make that the active shaft rotates to push the transparent cover plate and the flexible display panel both located in the housing to the display window.

According to an embodiment of the present disclosure, an inner side of the display window is provided with sliding slots, an outer side of the supporting board is provided with clamping edge portions, and the supporting plate is slidably engaged with the display window.

Compared with the prior art, the display device provided by the present disclosure has the flexible display panel, which has a part received in the housing and the other part outside the housing to be served as a regular display screen. After the part of the flexible display panel in the housing is stretched out, the display area can be enlarged, but the volume of the display device does not enlarge. When the panel is switched between a large-screen display state and a small-screen display state, the panel is not affected by bending stress, thereby extending lifetime of the screen.

BRIEF DESCRIPTION OF SEVERAL VIEWS OF THE DRAWINGS

In order to illustrate technical solutions of embodiments or in the prior art more clearly, drawings required in a description of the embodiments will be briefly introduced below. Obviously, the drawings in the following description are merely some embodiments of the present disclosure. Accordingly, other drawings may be obtained by those skilled in the art without any creative work.

DETAILED DESCRIPTION OF PREFERRED SPECIFIC EMBODIMENTS OF THE INVENTION

Figure 1A:
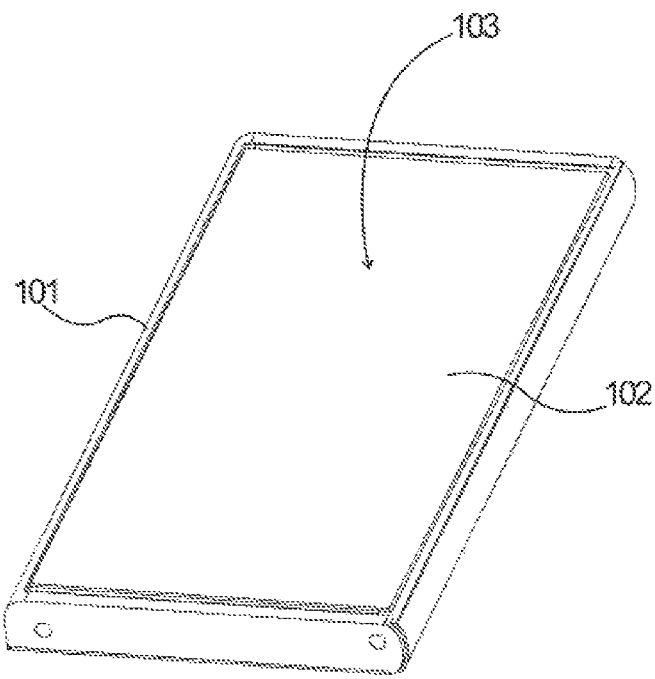
FIG. 1a is a schematic structural diagram of a display device provided by the present disclosure in a small-screen display state.

The following description of the various embodiments is provided with reference to accompanying drawings. Furthermore, directional terms mentioned in the present disclosure, such as top, bottom, front, rear, left, right, inner, outer, lateral side, which only refer to the direction of drawings. Therefore, the directional terms are used for the purpose of illustrating and understanding of the present disclosure, and are not intended to limit the present disclosure. In the drawings, units with similar structure are denoted by the same reference numerals.

The present disclosure is directed to an improvement of technical defects of large volume and short lifetime to bendable display devices in the prior art, and the present embodiments can solve the defects.

Figure 1B:
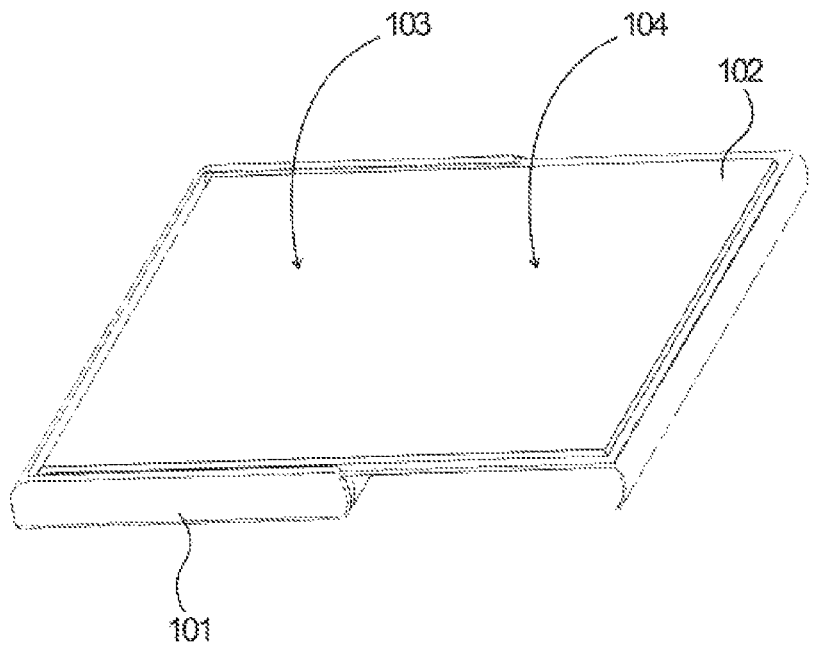
FIG. 1b is a schematic structural diagram of the display device provided by the present disclosure in a large-screen display state.

As shown in FIGS. 1a to 1b, a display device provided by an embodiment of the present disclosure includes a housing 101 and a flexible display panel 102 located in the housing 101. A bottom portion of the housing 101 is provided with a bottom cover. A display window 103 used for exposing the flexible display panel 102 is provided on a surface of the housing 101. The display window 103 movably engages with the flexible display panel 102. An unexposed part of the flexible display panel 102 is received in the housing 102.

As shown in FIG. 1a, in a small-screen display state, a part of the flexible display panel 102 is filled within the display window 103, and remaining parts of the flexible display panel 102 are curled in the housing 101.

As shown in FIG. 1b, in a large-screen display state, an end of the flexible display panel 102 is extended outwardly, the part of the flexible display panel 102 located within the display window 103 moves to an outer side of the display window 103, and the part of the flexible display panel 102 located within the housing 101 moves to the display window 103. A total display area is a sum of a display area of the flexible display panel 102 within the display window 103 and a display area of the flexible display panel 102 outside the display window 103.

The part being moved to the outer side of the display window 103 is a virtual display window 104. Thus, a position of the virtual display window 104 is dynamic. The virtual display window 104 is located within a bending radius of a portion of the flexible display panel 102 beyond the display window 103.

In a display state of double-sided screen (not shown in the drawings), if the flexible display panel 102 located outside the display window 103 shown in FIG. 1b is bent and attached to a back of the housing 101, then it can be realized that the display device is independently displayed and touched on a front side and a back side.

As shown in FIGS. 2a to 2f, a display device provided by an embodiment of the present disclosure includes a housing 201, a display window 203 provided on a side of the housing 201, a flexible display panel disposed in the housing 201 and within the display window 203, and an active shaft 207 and a scroll 208 both disposed in the housing 201, wherein a gear 2071 is disposed on an end of the active shaft 207, a bottom of the housing 201 is provided with a bottom cover 209, and a surface of the flexible display panel is provided with a transparent cover plate.

The housing 201 is further provided with a supporting board 205, a bottom of the supporting board 205 is provided with a rack 2072 that is engaged with the gear 2071. An exposed part of the flexible display panel and one end of the transparent cover plate are attached to the supporting board 205. The end of the transparent cover plate is connected to an end of the supporting board 205. The supporting board 205 is configured for a static or dynamic planar support to the flexible display panel.

Two ends of the transparent cover plate beyond an edge of the flexible display panel form a curled end and a traction end opposite to each other, wherein the curled end is unfoldably disposed in the housing 201, and the traction end is movably disposed outside the housing 201. When the traction end is moved toward an outer side of the housing 201, the curled end is unfolded, and the transparent cover plate and the flexible display panel both located in the housing are moved to the outer side of the housing 201.

Figure 2A:
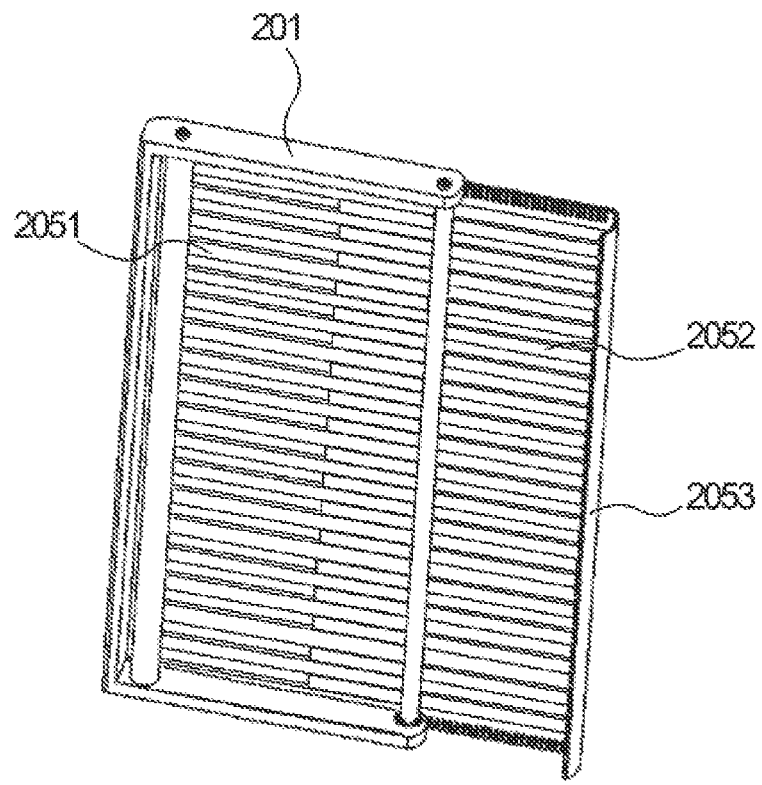
FIG. 2a is a schematic structural diagram of the display device provided by the present disclosure in a supporting board being expanded state.
Figure 2B:
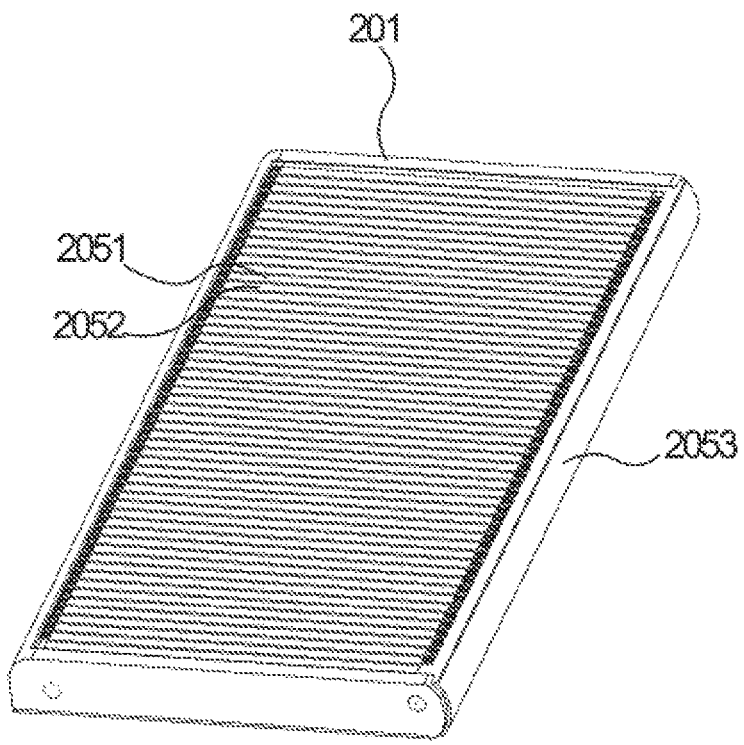
FIG. 2b is a schematic structural diagram of the display device provided by the present disclosure in a supporting board being merged state.
Figure 2C:
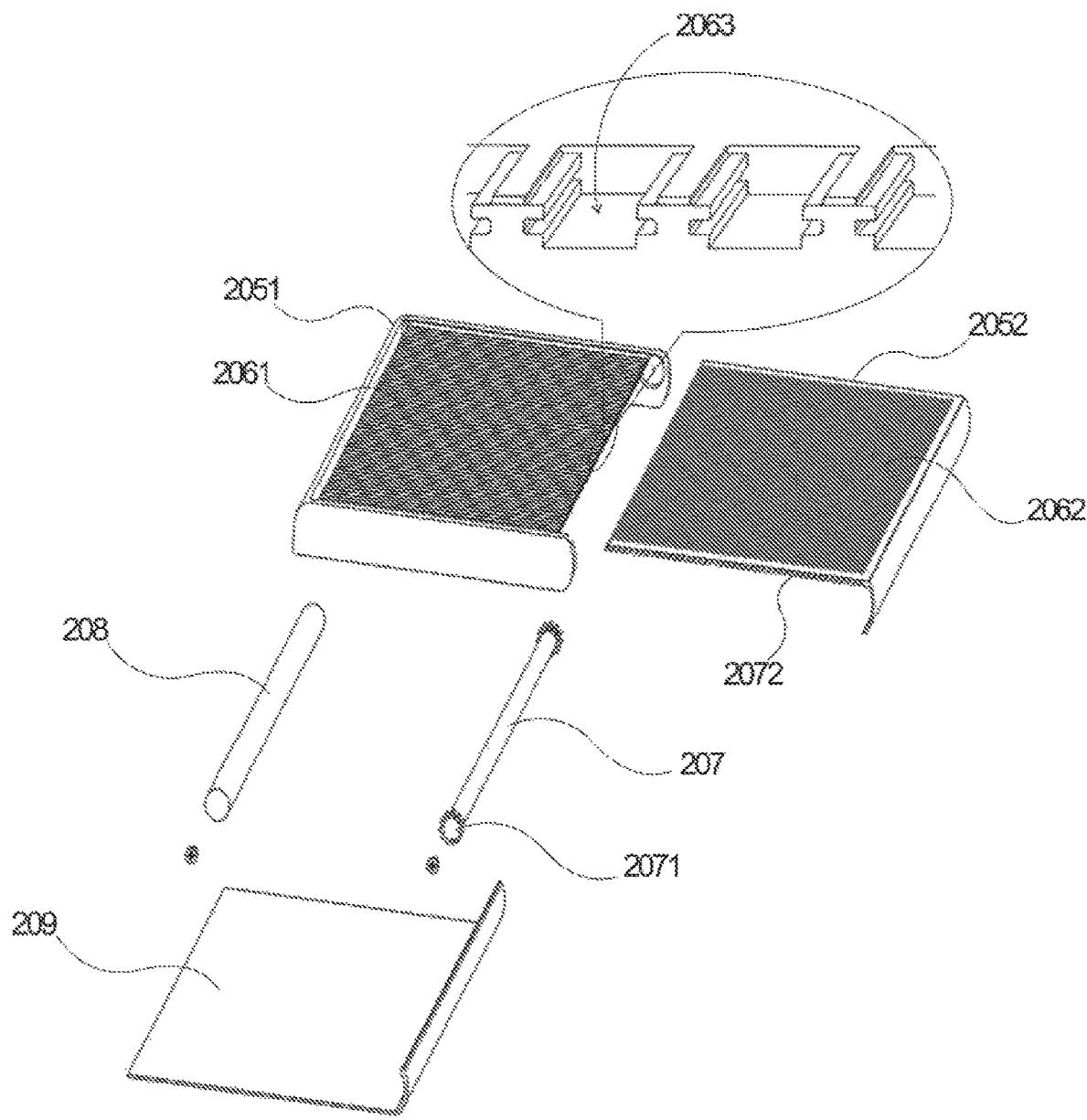
FIG. 2c is a structural explosion diagram of the display device provided by the present disclosure.
Figure 2D:
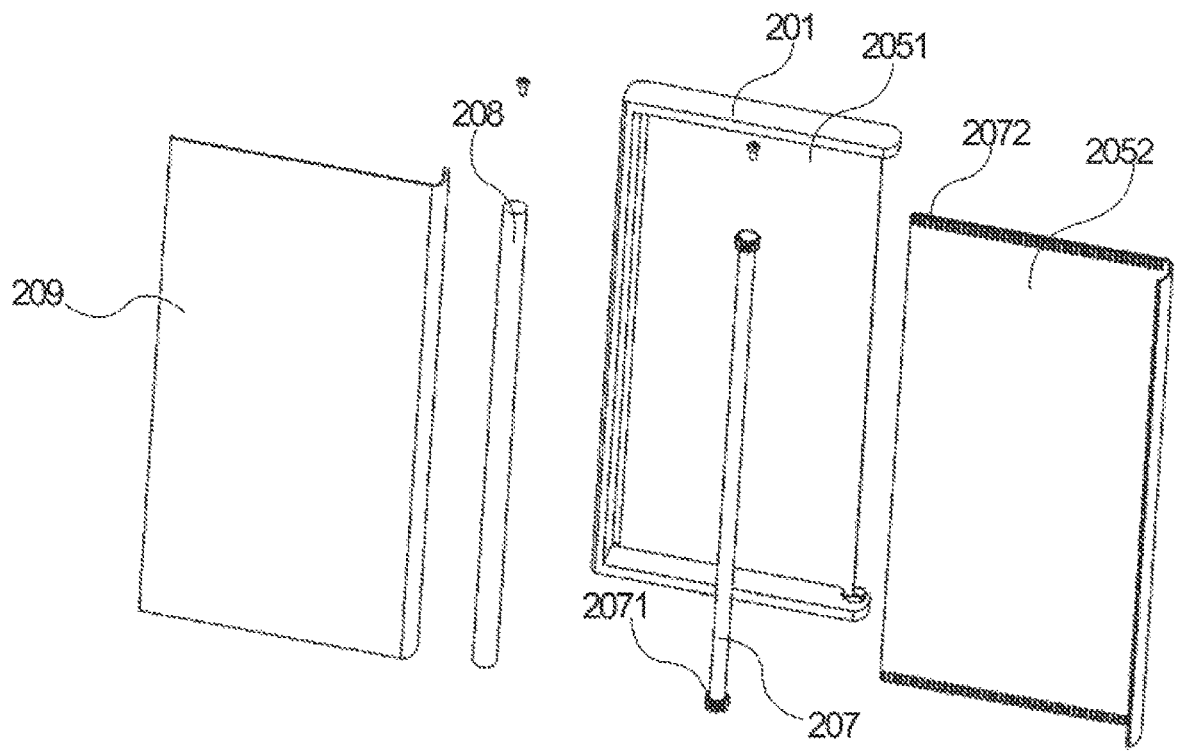
FIG. 2d is another structural explosion diagram of the display device provided by the present disclosure.

As shown in FIG. 2a-2c, an exposed part of the flexible display panel is attached to an outer surface of the supporting board 205, and an unexposed part of the flexible display panel is located in the housing 201 and is bent to another side of the supporting board 205. The supporting board 205 includes a fixing plate 2051 and an extension plate 2052 which can be moved to each other. The fixing plate 2051 is fixedly disposed within the display window 203, wherein a surface of the flexible display panel attached to the fixing plate 2051 is below to or aligned with a surface of the display window 203. An outer side of the extension plate 2052 is provided with a lateral plate 2053, wherein the lateral plate 2053 is magnetically attached to or away from the housing 201.

The fixing plate 2051 is fitted with the extension plate 2052, that is, the fixing plate 2051 and the extension plate 2052 are integrated in a vacancy cross-filling manner. Two supporting boards 205 have a uniform height and aligned surfaces. A surface of the flexible display panel attached to a surface of the supporting board 205 is flat. Meanwhile, the two supporting boards 205 are also prevented from which are stacked to increase a thickness of the display device.

Refer to FIGS. 2a to 2d, the fixing plate 2051 is engaged with the extension plate 2052 in a grid manner. The extension plate 2052 includes a first frame and a first fence support part 2061 located in the first frame, wherein the first frame has an opening end. The fixing plate 2051 includes a second frame and a second fence support part 2062 located in the second frame, wherein the second frame has an opening end. The opening end of the first frame is movably connected to the opening end of the second frame, and the first fence support part 2061 and the second fence support part 2062 are fitted to each other in an interlace manner.

The fixing plate 2051 is slidably engaged with the extension plate 2052, an inner side of the first fence support part 2061 is provided with clamping edge portions 2063, an inner side of the second fence support part 2062 is provided with sliding slots, and the clamping edge portions 2063 are slidably engaged with the sliding slots.

The first fence support part 2061 includes a plurality of first lattice parts that are parallel to each other. The first lattice parts are disposed toward the open end of the first frame. The second fence support part 2062 includes a plurality of second lattice parts that are parallel to each other. The second lattice parts are disposed toward the open end of the second frame. In the first fence support part 2061, inner sides of at least two of the first lattice parts are provided with the clamping edge portions 2063, and at least one of the lattice parts is disposed between two of the lattice parts that are provided with the clamping edge portions 2063. An end of each of the sliding slots is stopped on a surface where it is located, and is configured to limit each of the clamping edge portions 2063. A number and positions of the sliding slots disposed on the inner side of the second fence support part 2062 correspond to a number and positions of the clamping edge portions 2063.

Figure 2E:
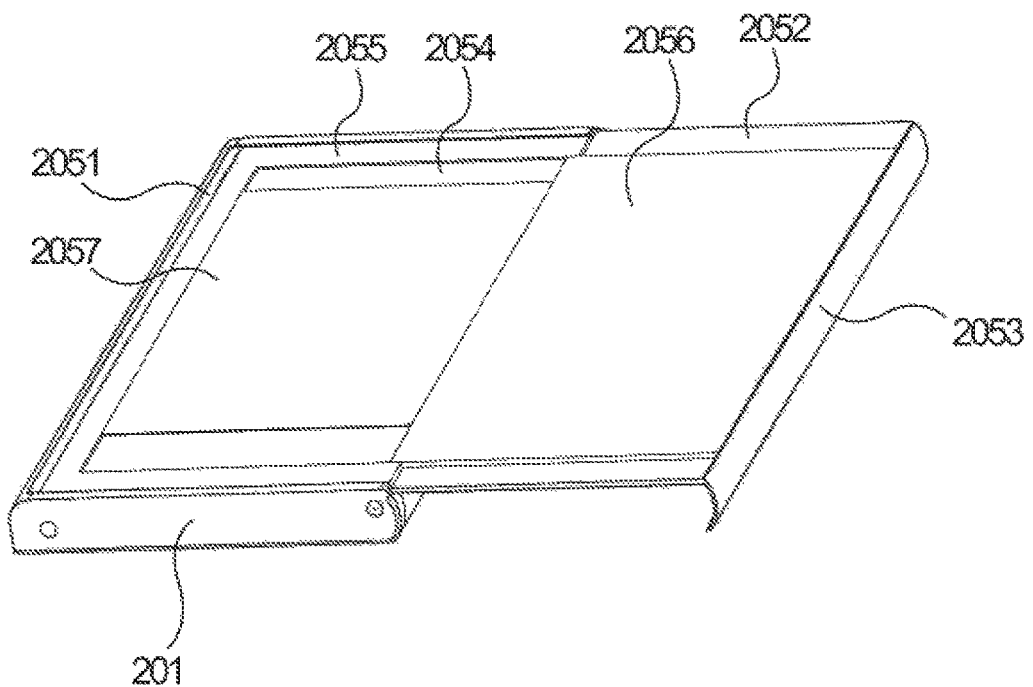
FIG. 2e is a schematic structural diagram of another embodiment of the display device provided by the present disclosure.

As shown in FIG. 2e, the fixing plate 2051 and the extension plate 2052 are fitted in a drawer manner. A surface of the fixing plate 2051 is formed with a cavity 2054, wherein the cavity 2054 has an open side and a closed side. The extension plate 2052 is sleeved with the cavity 2054. The extension plate 2052 enters from the open side of the cavity 2054 and slidably engaged with the cavity 2054. The surface of the fixing plate 2051 extends into the cavity 2054 to form a flange 2055 at an edge of the cavity 2054. The flange 2055 is configured to limit a movement of the extension plate 2052 in the cavity 2054. The surface of the fixing plate 2052 is provided with a convex platform 2056, wherein the convex platform 2056 is located within an area enclosed by the flange 2055. In addition, a surface of the convex platform 2056 is aligned with a surface of the flange 2055, and a surface of the extending plate 2052 is attached to the surface of the flange 2055.

In addition, a paving plate 2057 is disposed between the closed side of the cavity 2054 and the convex platform 2056. The paving plate 2057 is configured to pave a vacancy that is formed between the extension plate 2052 and the cavity 2054 after the extension plate 2052 moves outwardly relative to the fixing plate 2051 and is configured for a planar support part of the flexible display panel in the area.

For example, the paving plate 2057 may be a coil spring having a width. A fixed end of the coil spring is disposed at one end of the convex platform 2056. An acting end of the coil spring is disposed at a sidewall of the cavity 2054, wherein the torsion force formed by the coil spring can be used to limit a movement space of the extension plate 2052, and can assist the extension plate 2052 to go back into the cavity 2054.

Further, one side of the convex platform 2056 is formed with a resettlement slot, wherein a rotating shaft and a fixed shaft located on a side of the rotating shaft is disposed in the resettlement slot. A surface of the rotating shaft is infinitely close to a joint of the resettlement slot and the convex platform 2056. The fixed shaft is located at a center of the resettlement slot, and a midline of the fixed shaft coincides with a center line of the resettlement slot. A fixed end of the coil spring is infinitely close to a joint of the sidewall of the cavity 2054 and the surface of the fixing plate 2051. The coil spring goes round the rotating shaft, wherein the acting end of the coil spring curls the fixed shaft and is fixed to the fixed shaft.

Figure 2F:
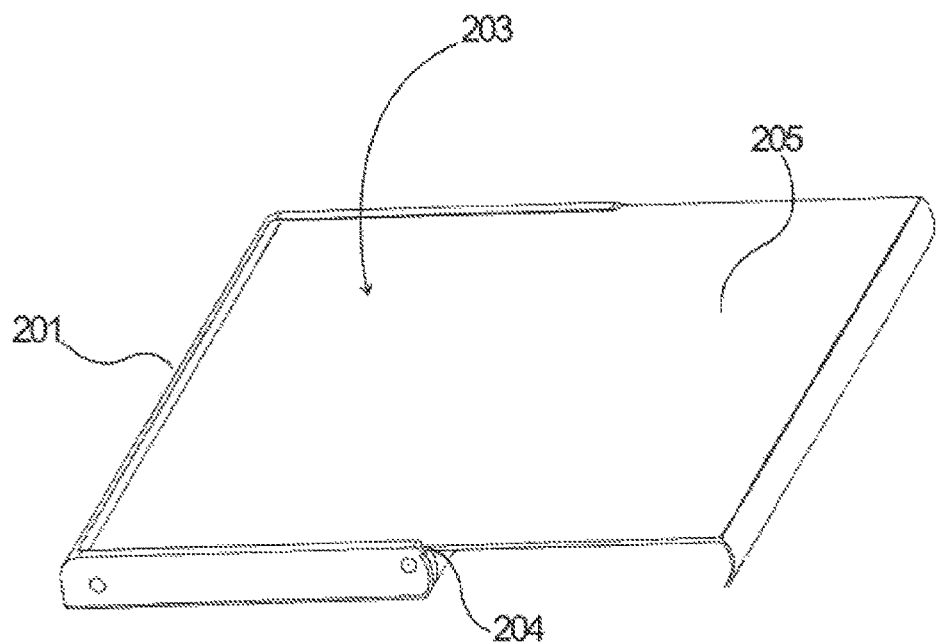
FIG. 2f is a schematic structural diagram of yet another embodiment of the display device provided by the present disclosure.

As shown in FIG. 2f, the supporting board 205 is made of a repeatable bending material. The exposed part and the unexposed part of the flexible display panel are attached onto a same face of the supporting board 205. An area of the supporting board 205 corresponding to the exposed part is located within the display window 203. An area of the supporting board 205 corresponding to the unexposed part is bent onto a back of the supporting board 205.

An inner side of the display window 203 is provided with sliding slots 204. An outer side of the supporting board 205 is provided with clamping edge portions. The supporting board 205 is slidably engaged with the display window 203.

The supporting board 205 includes an extension side and a fixed side opposite to the extension side, and the fixed side is curled.

Figure 3A:
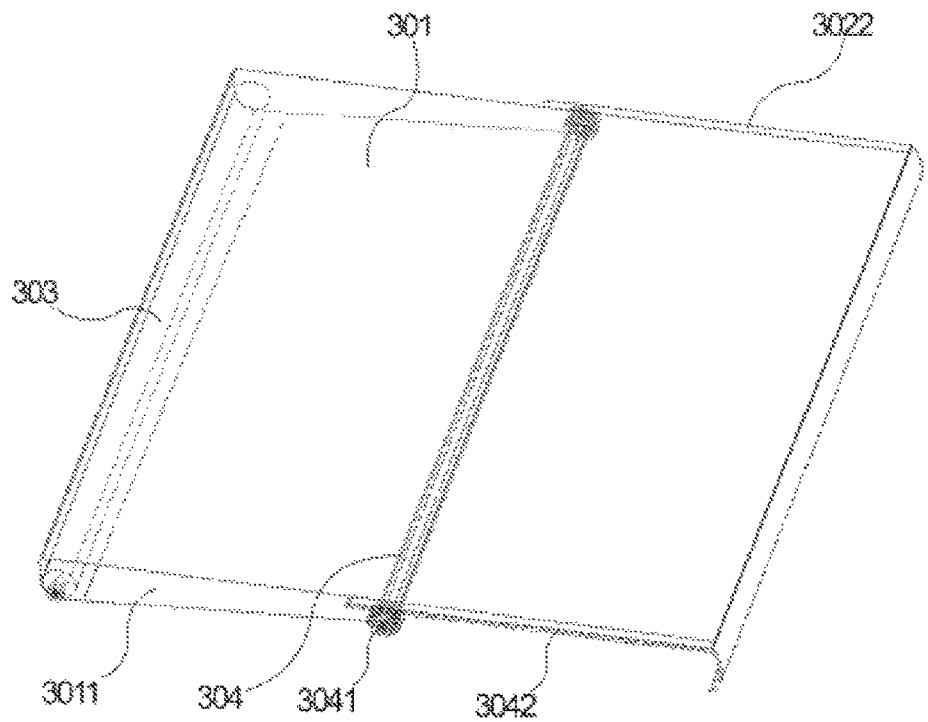
FIG. 3a is a schematic structural diagram of a curled system of the display device provided by the present disclosure.
Figure 3B:
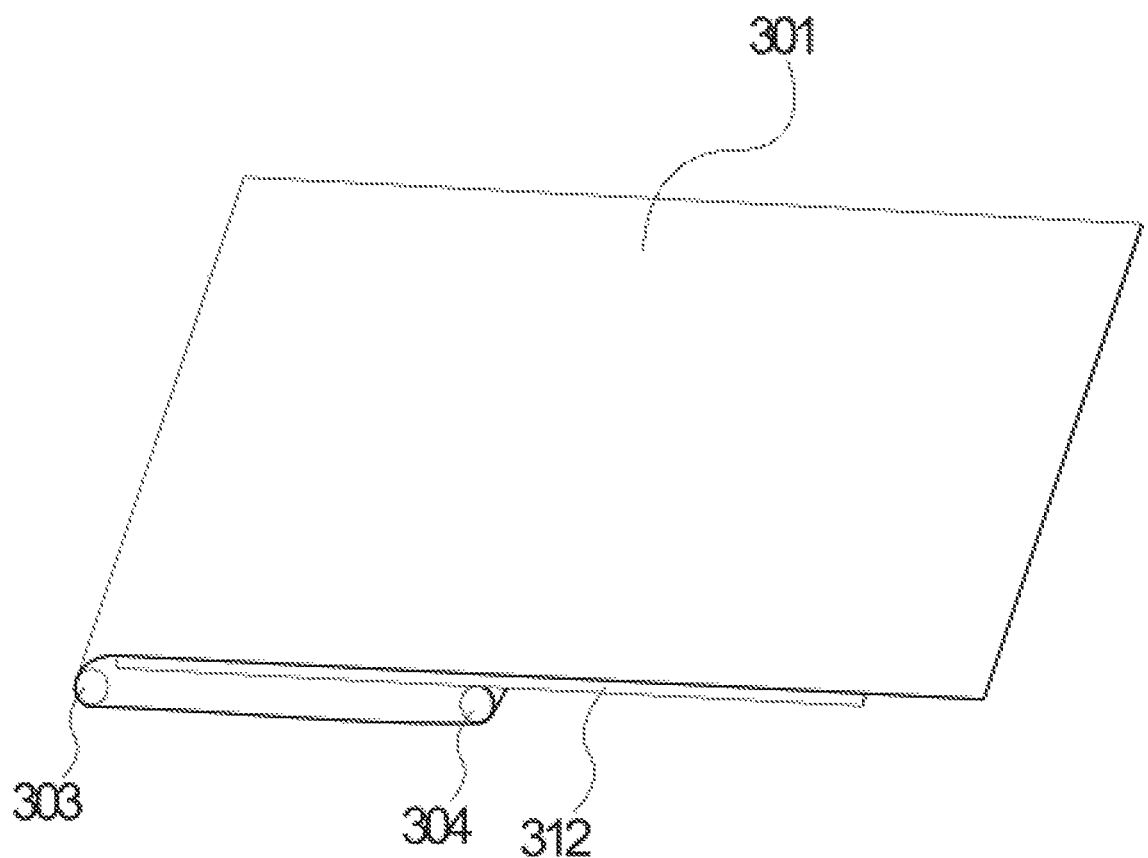
FIG. 3b is a deployed view of an organic light emitting diode (OLED) display panel of the display device provided by the present disclosure.

As shown in FIG. 3a, a display device provided by the present disclosure includes a housing, a display window provided on a side of the housing, and a flexible display panel disposed in the housing and within the display window. A supporting board is disposed in the housing. The flexible display panel is attached to the supporting board. The supporting board includes a fixing plate and an extension plate 3022 slidably engaged to each other. One end of an exposed part of the flexible display panel is connected to one end of the extension plate 3022. The supporting board is configured for a static or dynamic planar support to the flexible display panel.

A scroll 303 and an active shaft 304 parallel to each other are disposed in the housing. The active shaft 304 is located at an opening end of a second frame of the fixing plate. The scroll 303 is located at another end of the second frame. The active shaft 304 is provided with a gear 3041. A bottom of the extension 3022 is provided with a rack 3042 that is engaged with the gear 3041. The active shaft 304 rotates in conjunction with a sliding movement of the extension plate 3022.

The active shaft rotates in conjunction with a movement of the extension plate 3022. When a traction end of a transparent cover plate is moved toward an outer side of the housing, the gear and the rack are in transmission coordination to make that the active shaft rotates to push the flexible display panel and the transparent cover plate located in the housing into the display window. That is, when the flexible display panel and the transparent cover plate move, there are two ends in a linked state, which can avoid a technical problem that wrinkles of the display panel and the transparent cover plate are caused by force at one end or a technical problem that broken wires in a screen are caused by the tension at one end is too large.

A surface of the flexible display panel is provided with a transparent cover plate 301. One end of the transparent cover plate 301 beyond an edge of the flexible display panel forms a curled end 3011. The curled end 3011 of the transparent cover plate 301 is fixed on the active shaft 304. The transparent cover plate 301 goes round the scroll 303. In addition, another end of the transparent cover plate 301 is fixed at an outer end of the extension plate 3022.

Refer to FIGS. 3b to 3e, the flexible display panel 312 includes a light emitting layer 313, wherein one side of the light emitting layer 313 is provided with a backplane 305. The backplane 305 and the light emitting layer 313 are glued via a first optical adhesive layer 306. Another side of the light emitting layer 313 is provided with a touch panel 307 and a polarization layer disposed on a surface of the touch panel 307. The polarization layer includes a pressure sensitive adhesive (PSA) gluing layer 308 and a thin type circular polarizer 309. The touch panel 307 and the light emitting layer 313 are glued via a second optical adhesive layer 310. The transparent cover plate 301 and the polarization layer are glued via a third optical adhesive layer 311.

Figure 3C:
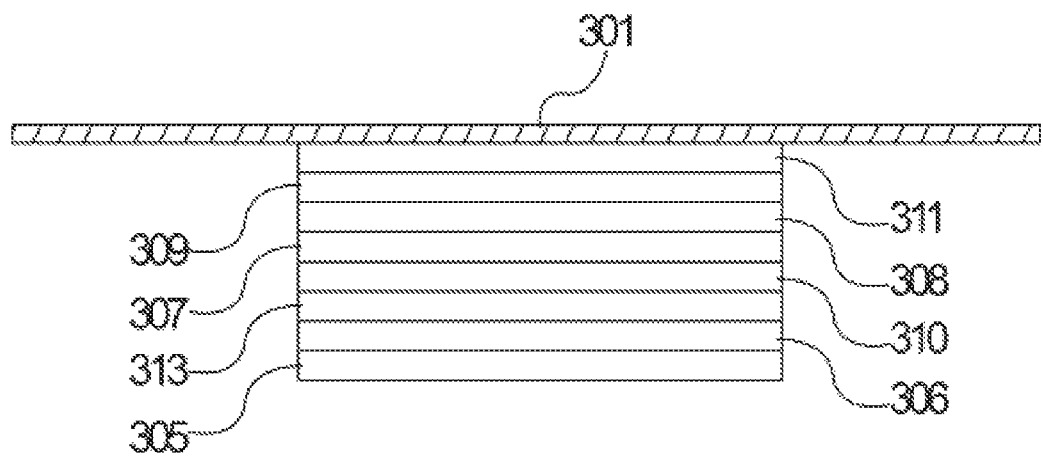
FIG. 3c is a schematic structural diagram of a plurality of layers of the OLED display panel shown in FIG. 3b.

Refer to FIGS. 3a and 3c, when the display device is switched from a small-screen display state into a large-screen display state, the extension plate 3022 is moved out relative to the fixing plate, so that the flexible display panel 312 located in the housing is then moved to the display window, thereby the extension plate 3022 combining with the flexible display panel 312 that is moved to the display window to perform a large-screen display. Meanwhile, the curled end of the transparent cover plate is presented in an unfolded state.

Figure 3D:
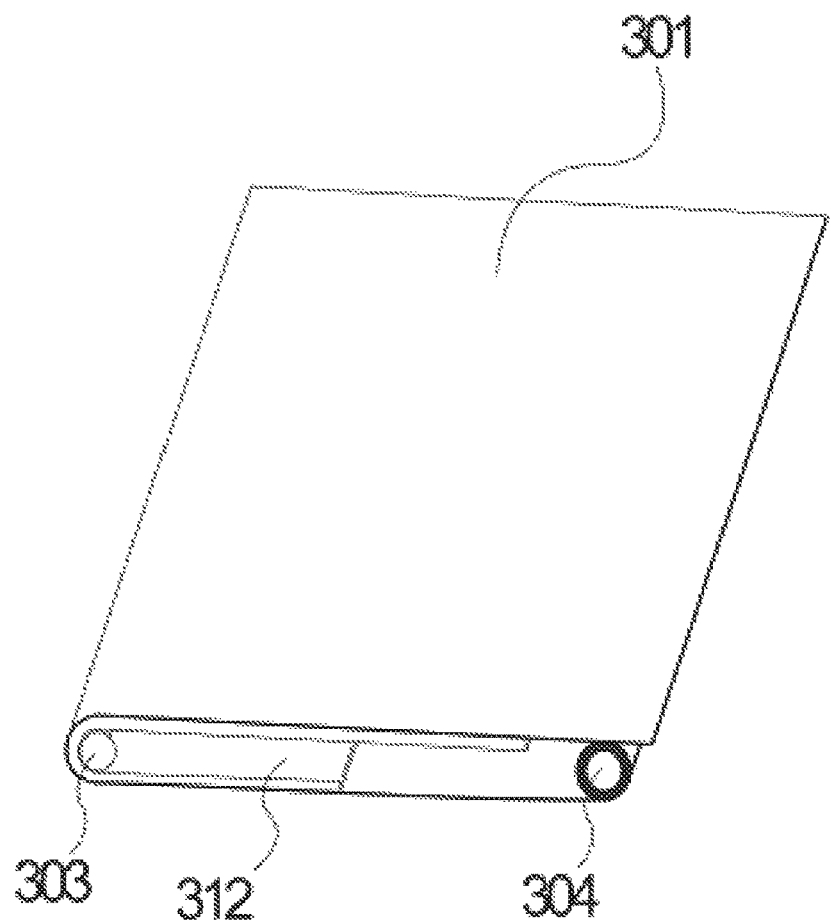
FIG. 3d is a curled view of the OLED display panel of the display device provided by the present disclosure.
Figure 3E:
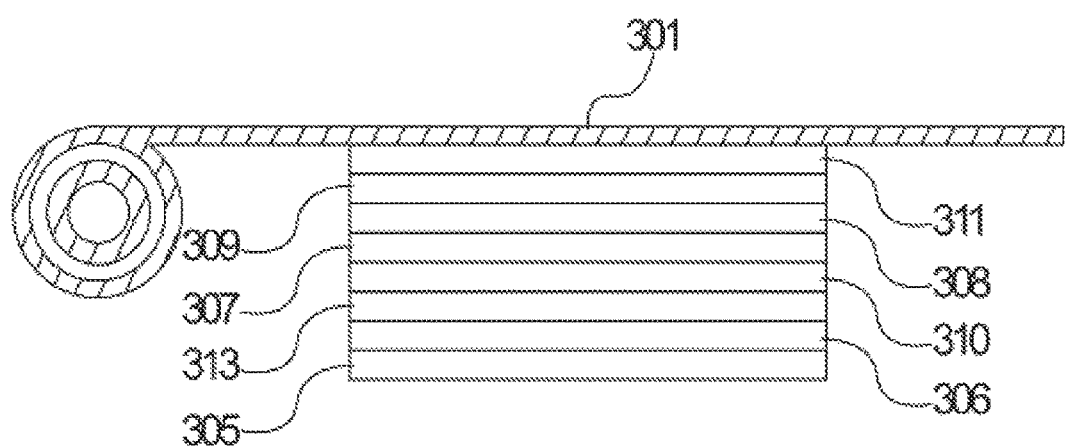
FIG. 3e is a schematic structural diagram of the layers of the OLED display panel shown in FIG. 3d.

Refer FIGS. 3d and 3e, when the display device is switched from the large-screen display state into the small-screen display state, the extension plate 3022 is moved to one side of the fixing plate, the rack 3042 at the bottom of the extension plate 3022 drives the active shaft 304 to rotate. Meanwhile, the curled end 3011 of the transparent cover plate 301 is curled. A part of the flexible display panel 312 is then received into the housing, and the other part of the flexible display panel 312 is in a position corresponding to the display window to realize a small screen display. Meanwhile, the curled end of the transparent cover plate is presented in a curled state.

An embodiment of the supporting board made of a repeatable bending material, and the exposed part and the unexposed part of the flexible display panel attached onto a same face of the supporting board is also adapted to the above switching scheme between the large-screen and the small-screen. The fixed end of the supporting board is in a curled connection with the active shaft 304. A specific adjustment principle is similar to the above description and is not described here.

Beneficial effects of the present disclosure are that, the display device provided by the present disclosure has the flexible display panel, which has a part received in the housing and the other part outside the housing to be served as a regular display screen. After the part of the flexible display panel in the housing is stretched out, the display area can be enlarged, but the volume of the display device does not enlarge. When the panel is switched between a large-screen display state and a small-screen display state, the panel is not affected by bending stress, thereby extending lifetime of the screen.

In the above, the present disclosure has been disclosed in the above preferred embodiments, but the preferred embodiments are not intended to limit the present disclosure, and those skilled in the art can make various modifications and refinements without departing from the spirit and scope of the present disclosure. Therefore, a scope of protection of the present disclosure is subject to a scope defined by the claims.

What is claimed is:
1. A display device, comprising:
  a housing having a display window; and
  a flexible display panel having a display area, wherein the display area has an exposed part and an unexposed part, the exposed part is partially or fully exposed within the display window, and the unexposed part is deformably disposed in the housing;
  wherein a surface of the flexible display panel is provided with a transparent cover plate, two ends of the transparent cover plate beyond an edge of the flexible display panel form a curled end and a traction end opposite to each other, the curled end is unfoldably disposed in the housing, the traction end is movably disposed outside the housing, and when the traction end is moved toward an outer side of the housing, the curled end is unfolded and the transparent cover plate and the flexible display panel both located in the housing are moved to the outer side of the housing.

2. The display device as claimed in claim 1, wherein a supporting board is further disposed in the housing and is located on an inner side of the display window, the exposed part of the flexible display panel and the traction end of the transparent cover plate are attached to the supporting board, and the unexposed part of the display region is bent on another side of the supporting board.

3. The display device as claimed in claim 2, wherein a scroll and an active shaft parallel to each other are further disposed in the housing, the active shaft is located at a first end of the housing where the traction end is disposed, and the scroll is located at a second end opposite to the first end of the housing, wherein the curled end of the transparent cover plate is fixed onto the active shaft, a middle portion of the transparent cover plate goes round the scroll, and the traction end of the transparent cover plate is fixed onto an outer end of the supporting board, wherein the active shaft is provided with a gear, a bottom of the supporting board is provided with a rack that is engaged with the gear, the active shaft rotates in conjunction with a movement of the supporting board, and when the traction end is moved toward the outer side of the housing, the gear and the rack are in transmission coordination to make that the active shaft rotates to push the transparent cover plate and the flexible display panel both located in the housing to the display window.

4. The display device as claimed in claim 2, wherein the supporting board comprises a fixing plate and an extension plate, the fixing plate is disposed within the display window, the extension plate movably engages with the fixing plate for extendedly forming a virtual display window, and wherein one end of the flexible display panel is connected to one end of the extension plate.

5. The display device as claimed in claim 4, wherein the extension plate is fitted with the fixing plate, and the extension plate is aligned with a surface of the fixing plate in a fitted state and in an extended state.

6. The display device as claimed in claim 5, wherein an outer side of the extension plate is provided with a lateral plate, and the lateral plate is attached to or away from the housing.

7. The display device as claimed in claim 5, wherein the extension plate comprises a first frame and a first fence support part located in the first frame, the first frame has an opening end; the fixing plate comprises a second frame and a second fence support part located in the second frame, the second frame has an opening end; and the opening end of the first frame is movably connected to the opening end of the second frame, and the first fence support part and the second fence support part are fitted to each other in an interlace manner.

8. The display device as claimed in claim 7, wherein the extension plate is slidably engaged with the fixing plate, an inner side of the first fence support part is provided with clamping edge portions, an inner side of the second fence support part is provided with sliding slots, and the clamping edge portions are slidably engaged with the sliding slots.

9. The display device as claimed in claim 5, wherein the extension plate and the fixing plate are fitted in a drawer manner, a surface of the fixing plate is formed with a cavity, and the cavity has an open side and a closed side, the extension plate is sleeved with the cavity, the extension plate enters from the open side of the cavity and slidably engaged with the cavity; wherein the surface of the fixing plate extends into the cavity to form a flange at an edge of the cavity, wherein the flange is configured to limit a movement of the extension plate in the cavity; and wherein the surface of the fixing plate is provided with a convex platform located within an area enclosed by the flange, a surface of the convex platform is aligned with a surface of the flange, a surface of the extending plate is attached to the surface of the flange.

10. The display device as claimed in claim 9, wherein a paving plate is disposed between the closed side of the cavity and the convex platform, and is configured to pave a vacancy formed between the extension plate and the cavity after the extension plate moves outwardly relative to the fixing plate and is configured for a planar support part of the flexible display panel in the area.

11. The display device as claimed in claim 1, wherein a supporting board is further disposed in the housing and is made of a repeatable bending material, the supporting board has a part located within the display window and remaining parts curled in the housing, and wherein the transparent cover plate and the flexible display panel are attached to a surface of the supporting board.

12. The display device as claimed in claim 11, wherein the supporting board comprises an extension side and a fixed side opposite to the extension side, and the fixed side is curled.

13. The display device as claimed in claim 12, wherein a scroll and an active shaft parallel to each other are disposed in the housing, the active shaft is located at a first end of the housing where the traction end is disposed, and the scroll is located at a second end opposite to the first end of the housing, wherein the curled end of the transparent cover plate is fixed onto the active shaft, a middle portion of the transparent cover plate goes round the scroll, and the extension side of the supporting board is slidably engaged with an inner side of the housing, wherein the active shaft is provided with a gear, a bottom of the supporting board is provided with a rack that is engaged with the gear, the active shaft rotates in conjunction with a movement of the supporting board, and when the supporting board is moved toward the outer side of the housing, the gear and the rack are in transmission coordination to make that the active shaft rotates to push the transparent cover plate and the flexible display panel both located in the housing to the display window.

14. The display device as claimed in claim 13, wherein an inner side of the display window is provided with sliding slots, an outer side of the supporting board is provided with clamping edge portions, and the supporting plate is slidably engaged with the display window.

* * * * *